United States Patent
Jansen et al.

(10) Patent No.: US 9,162,292 B2
(45) Date of Patent: Oct. 20, 2015

(54) SLIDING BLOCK, TOOL HOLDER AND TOOL CARRIER

(75) Inventors: Karlheinz Jansen, Schutterwald (DE); Hanjo Mauch, Lahr-Sulz (DE)

(73) Assignee: WTO Werkzeug-Einrichtungen GmbH, Ohlsbach (DE)

( * ) Notice: Subject to any disclaimer, the term of this patent is extended or adjusted under 35 U.S.C. 154(b) by 11 days.

(21) Appl. No.: 14/129,973

(22) PCT Filed: Jun. 28, 2012

(86) PCT No.: PCT/EP2012/062524
§ 371 (c)(1),
(2), (4) Date: Dec. 29, 2013

(87) PCT Pub. No.: WO2013/000983
PCT Pub. Date: Jan. 3, 2013

(65) Prior Publication Data
US 2014/0133903 A1 May 15, 2014

(30) Foreign Application Priority Data

Jun. 30, 2011 (DE) .......................... 10 2011 078 445

(51) Int. Cl.
*B23B 29/34* (2006.01)
*B23B 29/20* (2006.01)
*B23B 29/32* (2006.01)

(52) U.S. Cl.
CPC ............... *B23B 29/20* (2013.01); *B23B 29/205* (2013.01); *Y10T 403/56* (2015.01); *Y10T 403/70* (2015.01); *Y10T 403/7064* (2015.01)

(58) Field of Classification Search
CPC ............... B23B 29/244; B23B 29/246; B23Q 2220/002
USPC .............................................. 82/121, 120, 159
See application file for complete search history.

(56) References Cited

U.S. PATENT DOCUMENTS

| | | | |
|---|---|---|---|
| 5,833,403 A | 11/1998 | Barazani | |
| 6,003,415 A * | 12/1999 | Turner et al. | 82/159 |
| 6,062,764 A | 5/2000 | Rixen et al. | |
| 6,513,410 B2 * | 2/2003 | Forst et al. | 82/159 |
| 7,243,407 B2 * | 7/2007 | Daris | 29/38 C |
| 7,581,472 B2 * | 9/2009 | Miyairi et al. | 82/121 |
| 8,006,593 B2 * | 8/2011 | Sahm et al. | 82/158 |
| 2009/0090226 A1 | 4/2009 | Sahm et al. | |
| 2011/0094355 A1 | 4/2011 | Sheehy et al. | |
| 2012/0131809 A1 | 5/2012 | Sahm | |

FOREIGN PATENT DOCUMENTS

| | | |
|---|---|---|
| CN | 1157765 A | 8/1997 |
| DE | 199 40 330 A1 | 3/2001 |
| DE | 10 2005 045 662 A1 | 3/2007 |
| DE | 10 2005 060 817 A1 | 6/2007 |
| DE | 10 2008 048 206 A1 | 4/2010 |
| DE | 10 2009 033 805 A1 | 1/2011 |

(Continued)

*Primary Examiner* — Will Fridie, Jr.
(74) *Attorney, Agent, or Firm* — Gudrun E. Huckett

(57) ABSTRACT

A sliding block 31, a tool carrier 1 and a tool holder 3 are presented, providing a high-precision interface that is also adjustable. As a result, very exact positioning of the tool arranged in the tool holder 3 in relation to the tool carrier can be achieved. The repeat accuracies lie below five micrometers.

27 Claims, 11 Drawing Sheets

Figure 1B:
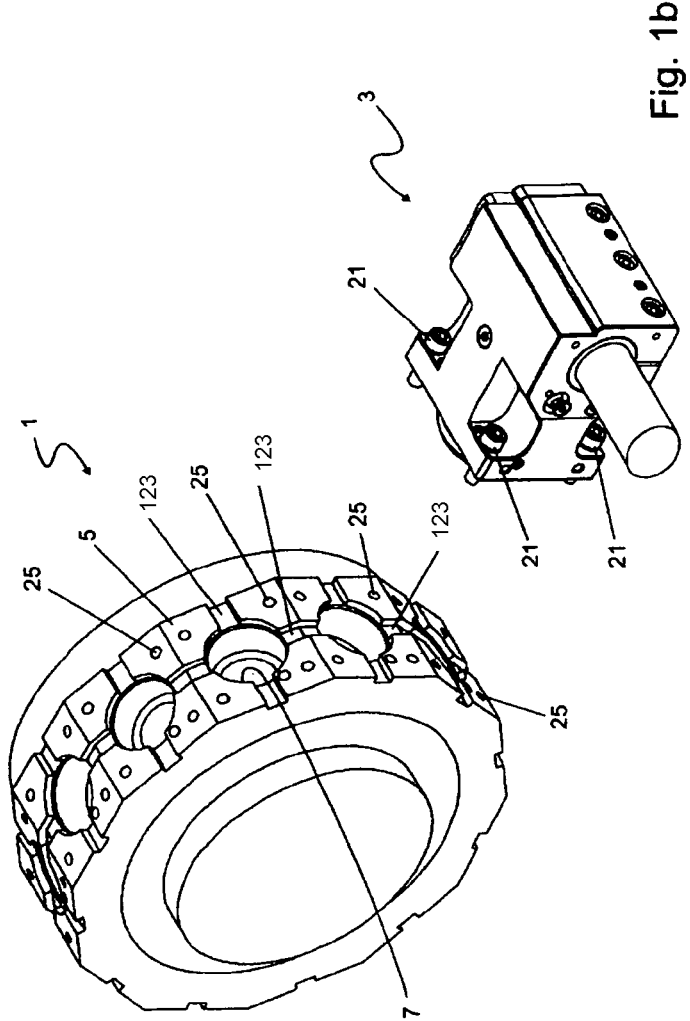

(56) References Cited  * cited by examiner

FOREIGN PATENT DOCUMENTS

EP  0 780 179  A1  6/1997
EP  1 992 435  A1  11/2008

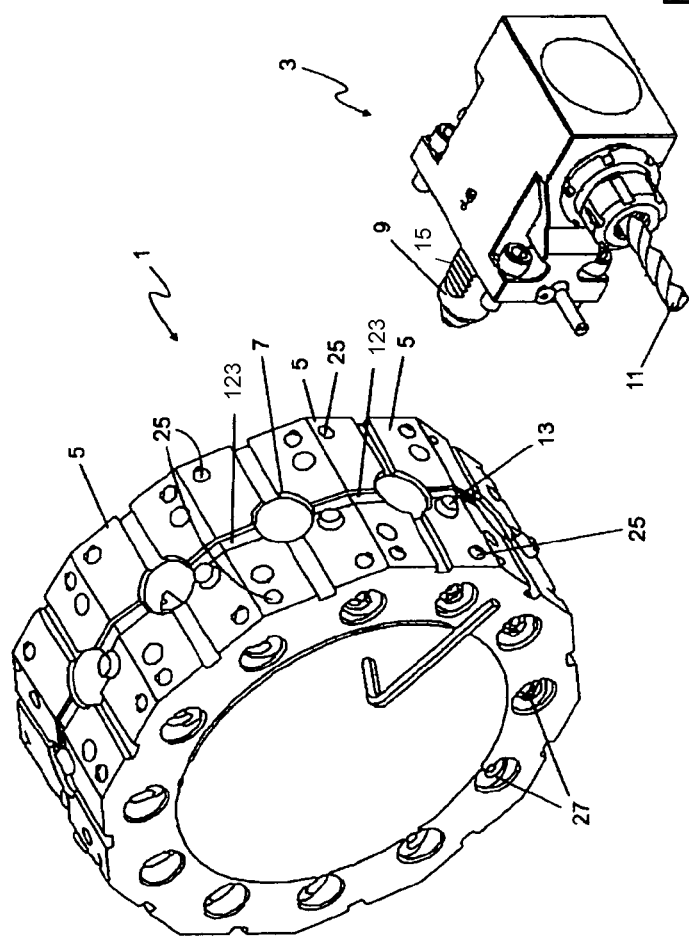

SLIDING BLOCK, TOOL HOLDER AND TOOL CARRIER

PRIOR ART

Tool carriers are known in the prior art that are arranged, for example, in the form of a so-called turret on a machine tool. These tool carriers have at least one clamping surface on which an exchangeable tool holder can be positioned and fastened.

A very successful system of tool carrier and tool holder is the so-called VDI tool holder which is standardized in DIN ISO 10889-1. This tool carrier is provided with a planar clamping surface in which a receiving bore is formed. Moreover, in the clamping surface a connecting bore for supply of the tool holder with a cooling lubricant is provided.

The tool holder that is compatible with this tool carrier has a contact surface from which a cylindrical shaft projects. The cylindrical shaft is compatible with the receiving bore of the tool carrier while the contact surface of the tool holder is compatible with the clamping surface of the tool carrier. The cylinder shaft is provided with a toothing that serves to secure the tool holder on the tool carrier such that the tool holder can transmit the forces required for machining a workpiece onto the tool carrier.

In addition to the simple construction, the low manufacturing costs for the tool carrier or the interface between tool carrier and tool holder in connection with the system according to DIN ISO 10899-1 are to be emphasized in particular. A disadvantage of this system is however the relatively minimal repeat accuracy upon insertion of tool holders into one and the same receiving bore. This relatively minimal repeat accuracy results in that the position of the cutting edge of the tool will change upon tool exchange. In order to ensure despite of this a uniformly high manufacturing quality, the deviations in positioning of the tool holder must be detected and compensated by the NC control of the machine tool. In the first case, the precision of the workpieces suffers. In the second case, the manufacturing costs increase greatly.

This disadvantage of the VDI tool holder has been known for quite some time and there are various attempts to overcome this disadvantage.

As an example, reference is being had in this context to DE 10 2005 045 662 A1. In this system that is not compatible with the VDI tool holder, two spaced-apart and adjustable trapezoidal fitting members are provided in the tool turret. These fitting members project past the clamping surface and interact with fitting surfaces of a complementary shape provided in the tool holder and enable an exact positioning of the tool holder relative to the clamping surfaces of the tool carrier. In this context, the fitting members are attached to a separate plate that upon manufacture of the tool turret is adjusted and subsequently fixed so that the fitting members are positioned with the desired accuracy relative to the receiving bore of the tool carrier. A disadvantage of this system is the comparatively high manufacturing expenditure because a groove must be milled into the clamping surface that provides space for the carrier plate of the fitting members. Subsequently, the fitting members must be aligned relative to the tool turret and secured by pins and/or screws in this position. This process requires highly qualified personnel and is still subject to a certain error rate.

A similar system which also operates with trapezoidal fitting members is disclosed in EP 780179 B1. Here, on the end faces of the tool turret the trapezoidal fitting members are formed that interact with complementarily shaped depressions in the tool holder. Both systems have in common that their manufacturing costs are relatively high and that also a relative high amount of working time by highly qualified personnel is required for tooling.

DE 199 40 330 C2 discloses a system comprising a tool carrier and a tool holder whose clamping or contact surfaces have grooves arranged in a cross shape. Into the grooves of the tool holder sliding blocks are inserted which project past the contact surface.

For improving the positioning accuracy and the repeat accuracy the sliding blocks are comprised of several parts. One part of this sliding block that has a contact surface is slidable along an inclined plane. In this way, the contact surface of the moveable part of the sliding block can be moved parallel to the clamping surface of the tool carrier and the position of the tool which is received in the tool holder can be adjusted in this way. Disadvantages of this solution are the high manufacturing expenditure, the enormous spatial demand, weakening of the tool holder, and difficult accessibility of the adjusting screws.

SUMMARY OF THE INVENTION

The invention has the object to provide a tool carrier and a tool holder compatible therewith that has a simple configuration and exhibits a significantly higher positioning accuracy in comparison to a conventional VDI system comprised of tool carrier and tool holder according to DIN ISO 10899-1 or/and known systems in BMT configuration, i.e., with tool holders that are secured by screws or other clamping elements on a tool carrier.

This object is solved according to the invention by at least one single-part sliding block with a slotted base member characterized in that in the sliding block a slot is formed that is arranged off-center; a tool holder for tools comprising a contact surface, wherein in the contact surface means for fastening at least one sliding block are provided and the sliding block is a sliding block as defined above; and a tool carrier for receiving a tool holder comprising a clamping surface, wherein in the clamping surface at least one groove is formed.

The basis of the interface according to the invention is a sliding block with a base member, wherein the base member has at least one contact surface, a base surface, and a through bore that is penetrating the base surface, the sliding block characterized in that at least one slot is formed in the sliding block.

The slot extends in the same direction as the at least one contact surface and is positioned preferably at an angle greater zero (>0°) relative to the contact surface. The bottom of the slot extends mostly parallel to the base surface. The slot is arranged off-center in many applications.

The sliding block must be secured only on the tool holder in a defined position. This can be realized by means of two contact surfaces relative to the tool holder. In this context, the contact surfaces however must not be parallel. It is important that an unequivocal positioning of the sliding block relative to the tool holder is realized. This can be achieved by means of pin connections, pegs, a contact surface and a screw that passes through a bore that is NOT orthogonal, or many other solutions. Important is in this context that the at least one required contact surface of the sliding block in the end is parallel to a groove present in the tool carrier.

In connection with the invention in all embodiments the sliding block or sliding blocks are inserted into a groove or several grooves of the tool holder. The section of the sliding block or sliding blocks that is projecting in the inserted state past the contact surface of the tool holder is received by one or several grooves of the tool carrier. Accordingly, the tool that is clamped in the tool holder is positioned exactly and reproducibly relative to the tool carrier. Of course, the reverse arrangement thereof is possible also. In this case, the sliding blocks are secured in the tool carrier and engage one or several grooves of the tool holder. For this arrangement protection is sought also.

By means of the slot that is not extending down to the base surface of the sliding block, the sliding block is divided into a first stiff section as well as a second elastic springy section. The base surface belongs to the stiff part of the sliding block. This stiff part is generally pressed into a groove of a tool holder so that an unequivocal and very load-resistant fixation of the sliding block in the tool holder is ensured. The slotted and therefore elastic springy second section of the sliding block projects past a contact surface of the tool holder and is inserted into a groove of a tool carrier which is attached to a machine tool.

As a result of the partial elasticity of the sliding block according to the invention, it is ensured that at least one of the two contact surfaces of the sliding block is pressed in a springy fashion against a sidewall of the groove in the clamping surface of the tool carrier. In this way, there results an excellent repeat accuracy upon insertion of the tool holder into the tool carrier with simultaneous ease of mounting or removal of a tool holder according to the invention.

When the entire sliding block is embodied as a solid body, either the sliding block must be mounted with clearance or a very great force must be applied in order to press the sliding blocks into the grooves of the tool carrier. Both effects are undesirable because firstly they reduce the reproducibility and also, in practice, cause disruptions of operation.

An especially advantageous embodiment of the invention provides that a longitudinal axis of the through bore passes through the slot. In this way, it is possible to use the head of a fastening screw for spreading apart the springy part of the sliding block. This applies primarily when the screw head of the fastening screw is designed of a truncated cone shape and in the through bore of the sliding block an appropriately shaped truncated cone shaped section is existing.

By screwing in the fastening screw to a greater or lesser extent, the single-part sliding block is consequently spread apart and, in this way, the tool holder is adjusted with respect to its position relative to the sliding blocks. Moreover, the spring stiffness of the elastic part is increased over-proportionally by the screw head that is supported on both sides of the groove.

In this way, it is possible to compensate the variations that occur despite a high-precision manufacture between tool holders of identical construction of one series. In this connection, it is sufficient when the sliding block according to the invention enables the adjustment or correction of the position of the tool holder by a few hundredths of a millimeter.

Alternatively, it is also possible that the through bore is positioned between a plane that is defined by the slot and one of the contact surfaces. In this way, the springy part of a sliding block according to the invention is not penetrated by the fastening screw or the through bore so that the spring action can develop fully.

In a further advantageous embodiment of the invention on one of the contact surfaces a shoulder is formed that projects laterally past the contact surface. This shoulder is preferably present on the springy contact surface of the sliding block according to the invention and projects, when the sliding block is inserted into the groove of a tool holder according to the invention, somewhat past the contact surface of the tool holder.

The shoulder forms together with a springy part of the sliding block an angled lever. When it is pressed onto the clamping surface of the tool carrier upon mounting the tool holder according to the invention, the shoulder will cause the springy part of the sliding block to move laterally in outward direction against a sidewall of the groove in the tool carrier. This provides ease of mounting of the tool holder because the sliding block can be inserted with some clearance or a transition fit into the groove of the tool carrier. Only once the tool holder with its contact surface is pressed against the clamping surface of the tool carrier, a clamping action between the sliding block and the contact surfaces of the groove will be generated.

In a further advantageous embodiment of the invention, it is provided that on one of the contact surfaces in the area of the base surface at least one projection is formed which, in practice, projects less than 0.3 mm past the contact surface. This projection serves to achieve an unequivocal and predictable contact situation between the contact surfaces of the sliding block and the contact surfaces of the appropriately shaped grooves in the tool holder.

The projection according to the invention causes a small, partially plastic, deformation either of the sliding block or of the groove in the tool holder so that the sliding block with its oppositely positioned contact surface is firmly and predictably pressed against the appropriate sidewall of the groove of the tool holder. In this way, the positioning accuracy and the repeat accuracy are improved even though the tolerance requirements for the manufacture of the sliding block or the groove width in the tool holder are comparatively minimal in accordance with the invention.

The advantages according to the invention are also achieved by the tool holder according to one of the coordinate claims 8 to 16. In this connection, a contact surface of the tool holder has one or preferably two grooves that extend orthogonally relative to each other. In the groove bottom of these grooves there is at least one threaded bore. Into this threaded bore, a fastening screw that has been inserted beforehand through the through bore in the sliding block can be screwed in and, in this way, the sliding blocks can be fastened in the groove of the tool holder. This fastening screw can also be used for spreading apart the sliding block.

In this connection, it is advantageous when the at least one threaded bore is positioned off-center in the groove.

In this connection, the threaded bores can be positioned on the same side of a symmetry axis of the groove or on opposite sides of the symmetry axis. When the threaded bores are positioned on the same side of a symmetry axis of the groove, the tool holder can be moved in a direction orthogonal to the longitudinal axis of the groove by uniformly tightening the fastening screws. By one-sided or opposite tightening or release of the fastening screws, a rotational movement of the tool holder can be achieved.

The results of this adjustment can be still further improved when a pretension is also generated that forces the tool holder with sliding block against the position-determining sidewall of the groove in the tool carrier. In accordance with the invention, this is possible, for example, by double-slotted sliding blocks. In this connection, the slot that is responsible for the setting action/adjustment is substantially arranged in the first section of the sliding block while the slot that is responsible for the spring action is substantially arranged in the second section of the sliding block. The pretension can be achieved alternatively also by additional spring elements; for example, an O-ring on the shaft of a VDI tool holder, wherein the O-ring is arranged in a groove which is arranged eccentrically to the central axis of the shaft. By means of the resulting eccentricity of the O-ring an additional spring force and a defined pretension are generated.

When the threaded bores are positioned on opposite sides of the symmetry axes, a rotation as well as a movement of the tool holder can be achieved by tightening/releasing the fastening screws. Both variants can be realized with the same manufacturing costs and identical sliding blocks so that the bore pattern can be selected in accordance with the requirements of the concrete application situation.

In a further advantageous embodiment of the invention, it is provided that the at least one groove is of a stepped configuration on one contact surface so that a pocket is formed that serves for receiving, for example, a lateral shoulder of the sliding block, the shoulder being formed on the contact surface of the sliding block and projecting laterally past the contact surface.

For realizing the interface according to the invention between a tool carrier and a tool holder, a tool carrier with a clamping surface is required wherein in the clamping surface at least one groove, preferably two grooves that are positioned orthogonally to each other, are formed. The constructive features of this tool carrier include a clamping surface wherein in the clamping surface at least one groove, preferably two grooves that are preferably orthogonally arranged relative to each other, are provided. The tool carrier is embodied for receiving one or several sliding blocks as described above and/or for receiving a tool holder as described above. The clamping surface has a receiving bore, in particular a receiving bore embodied in accordance with DIN ISO 10889-1, and the longitudinal axis of the receiving bore extends orthogonally relative to the clamping surface, wherein the clamping surface has several, preferably four, fastening threads.

Further advantages and advantageous embodiments of the invention can be taken from the following drawing, its description, and the claims. All features that are disclosed in the drawing, its description and the claims can be important to the invention individually as well as in any combination with each other.

DRAWING

Figure 2:
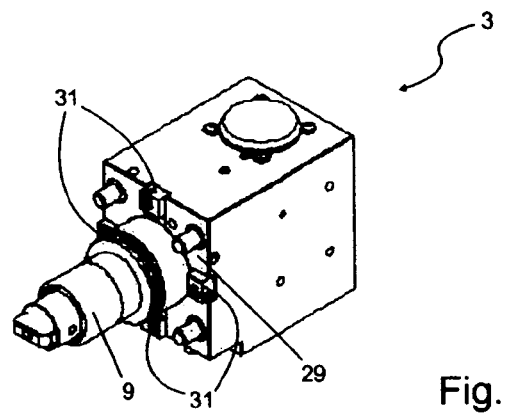
Figure 3:
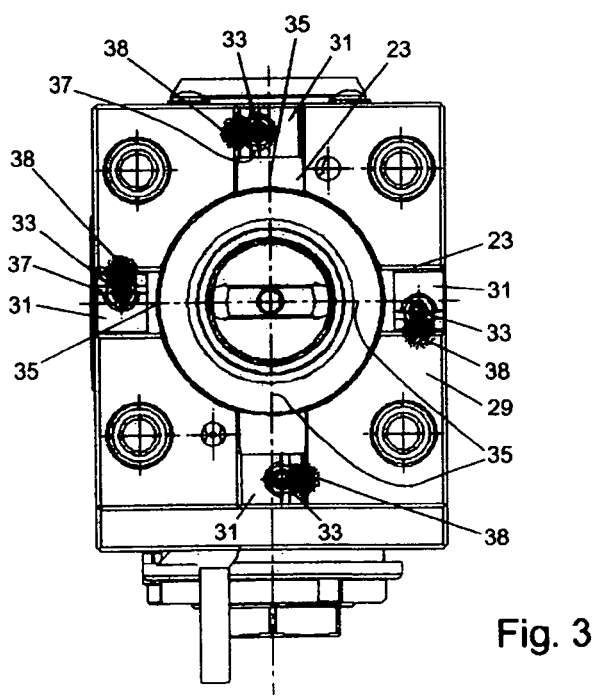
Figure 4:
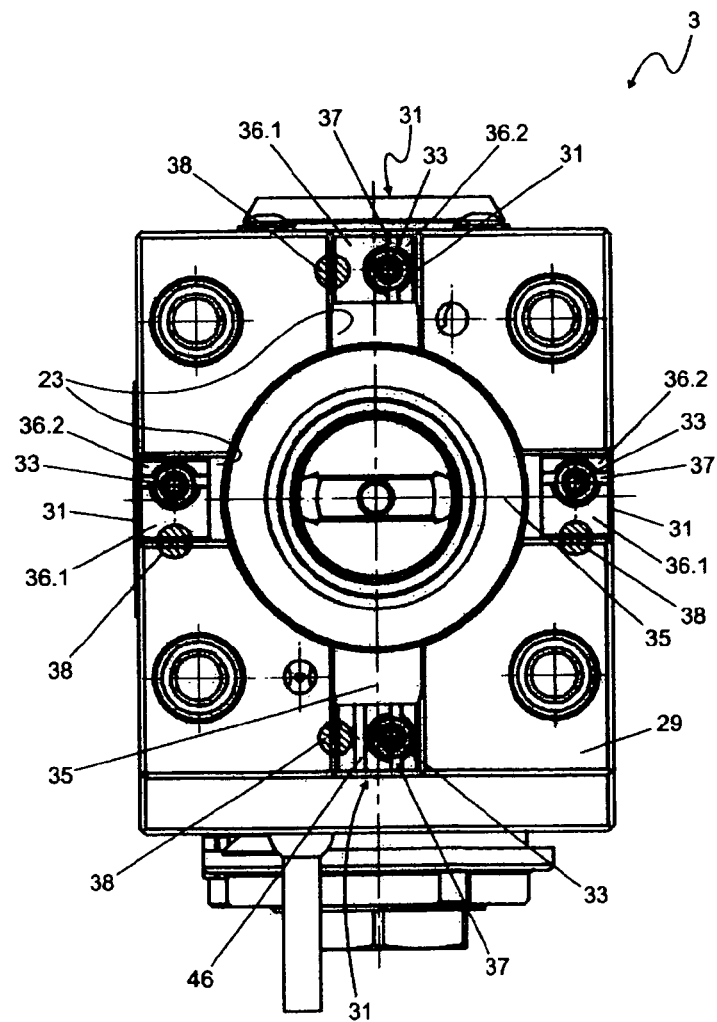
Figure 5:
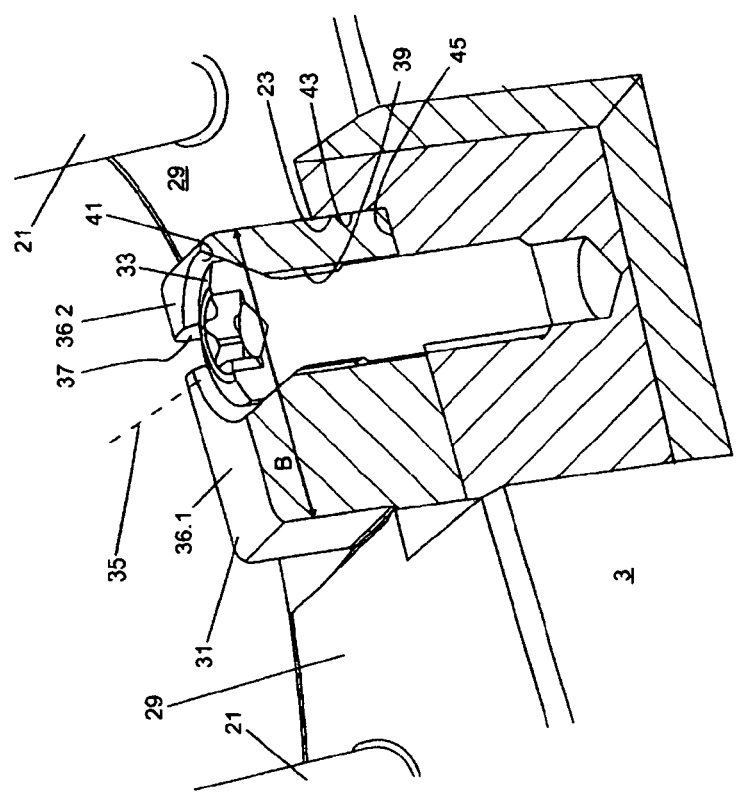
Figure 6:
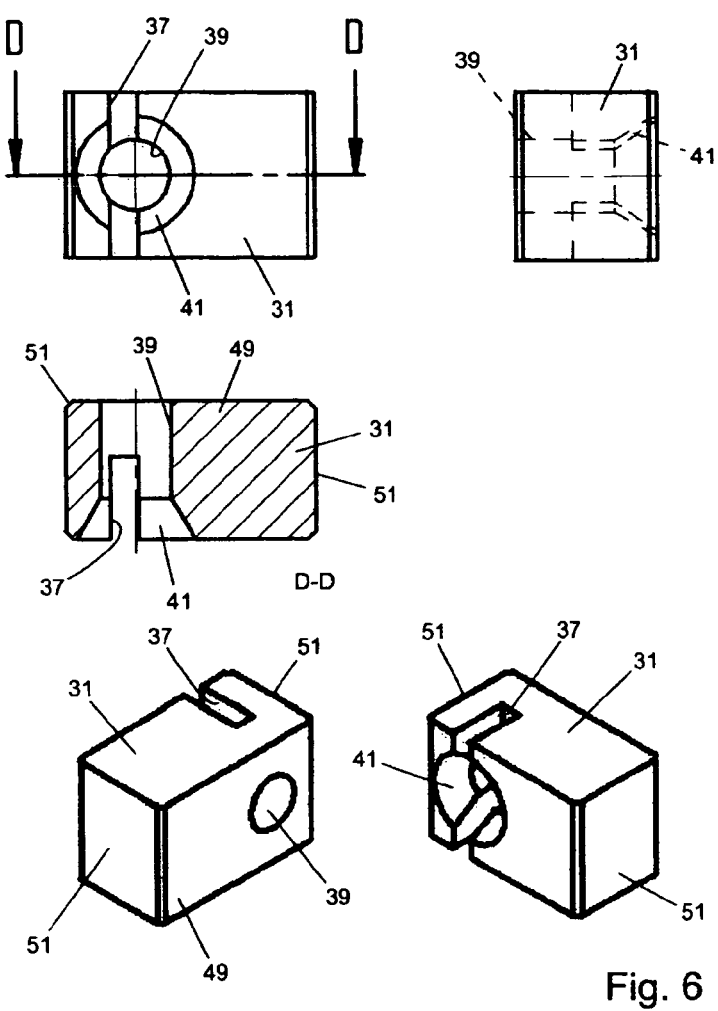
Figure 7:
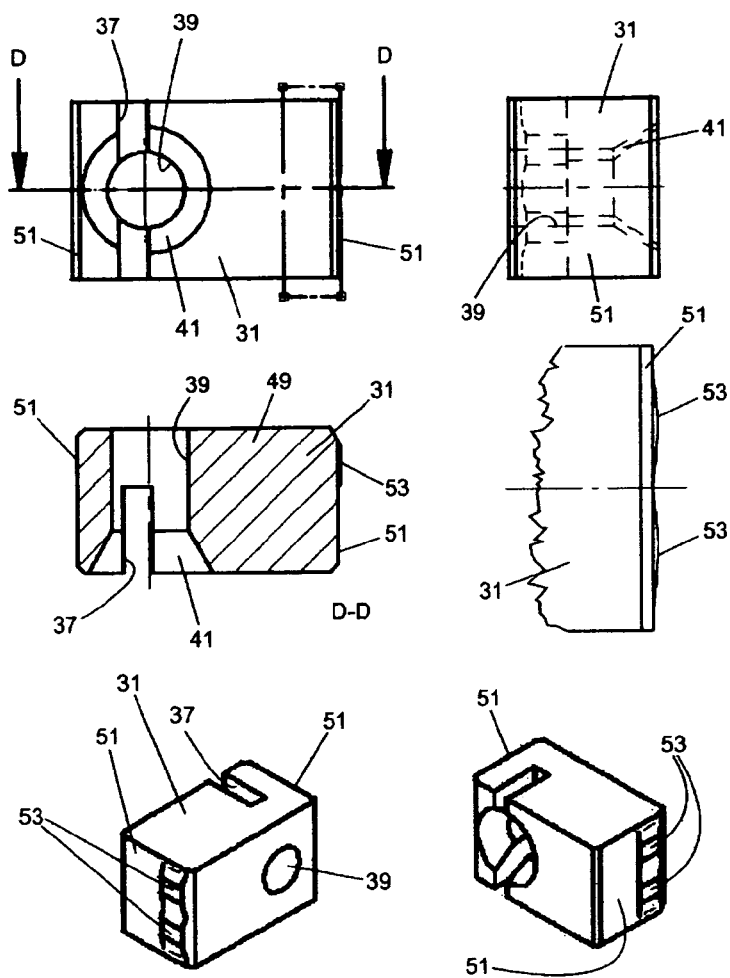
Figure 8:
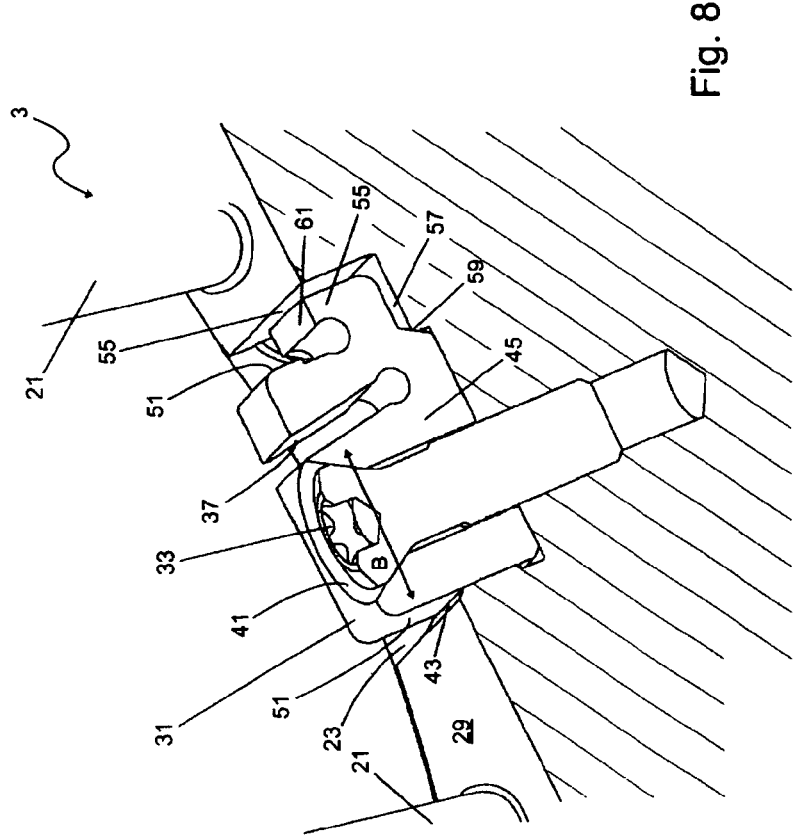
Figure 9:
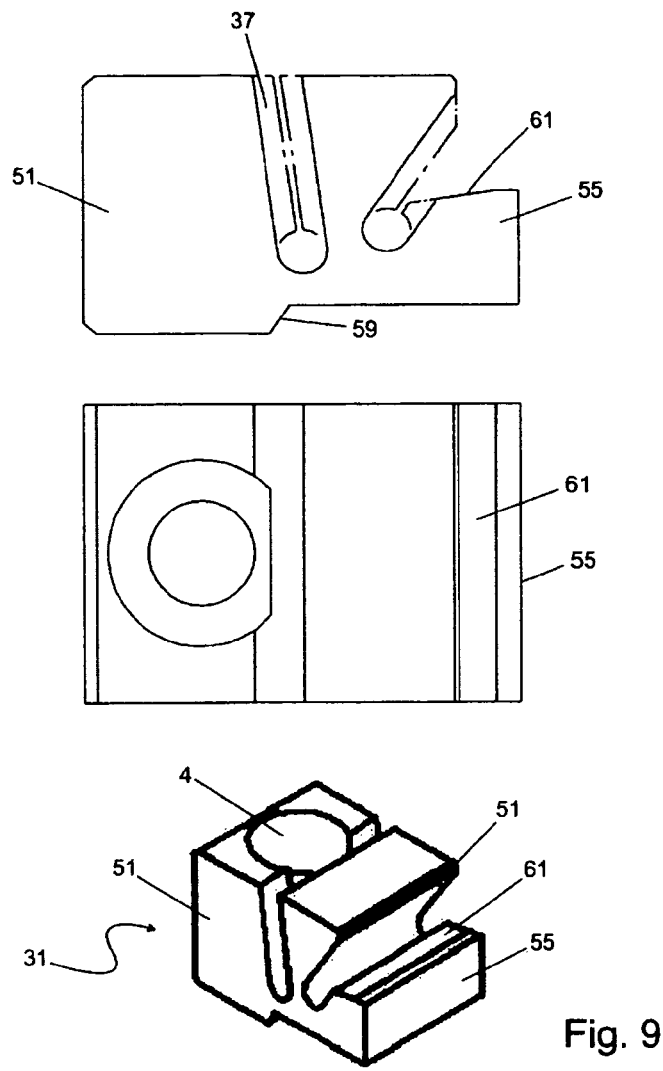
Figure 10:
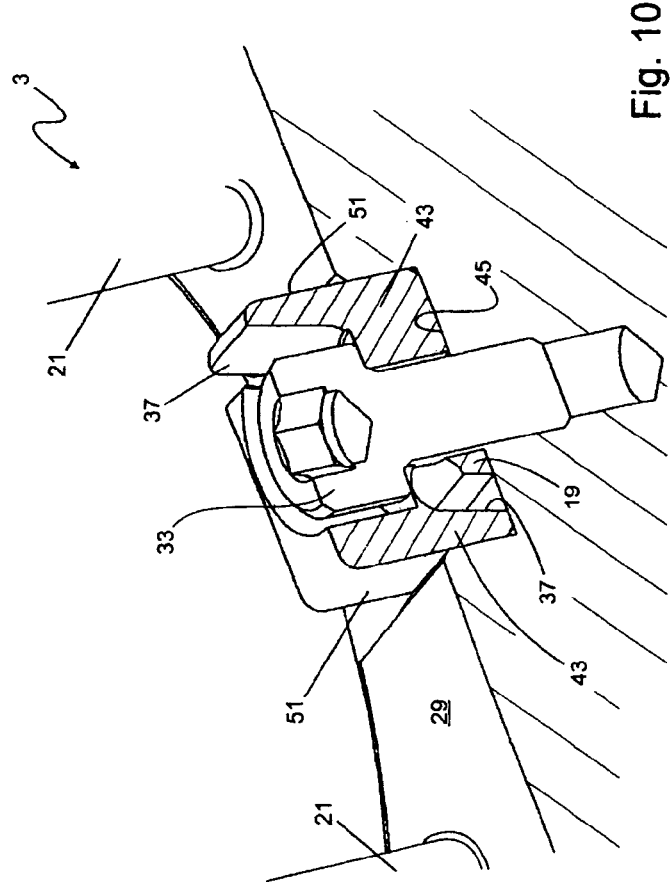
Figure 11:
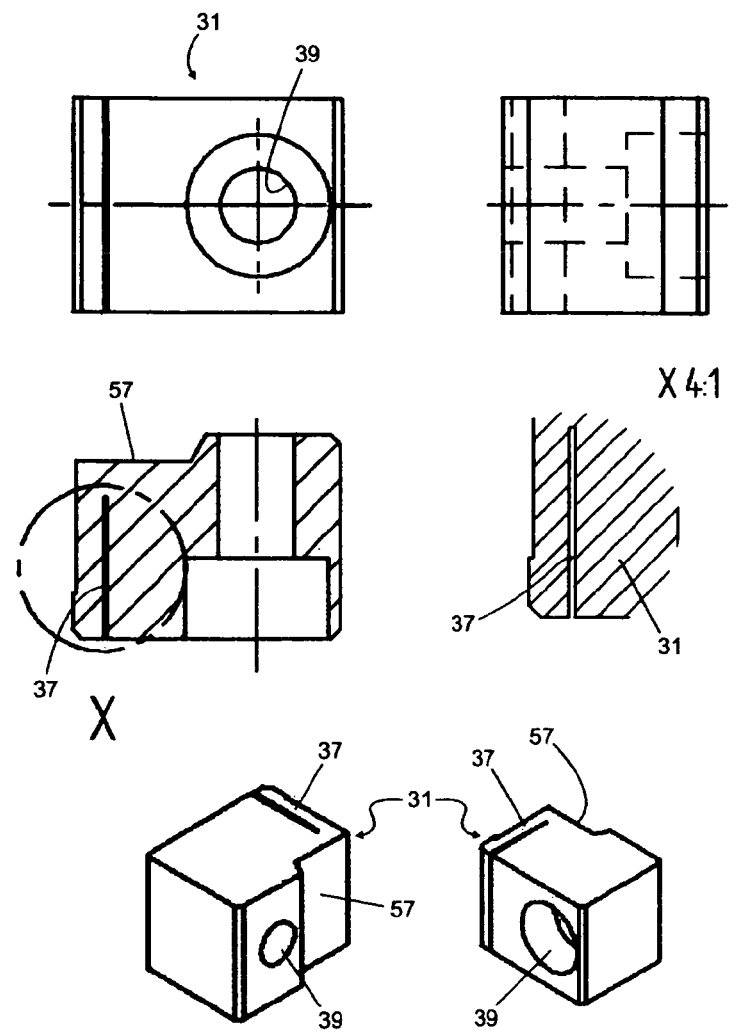

It is shown in:

FIG. 1a a first embodiment of a VDI turret according to the invention with conical fixation with driven tool in angled configuration;

FIG. 1b a second embodiment of a BMT turret according to the invention with conical fixation and drill holder in angled configuration;

FIG. 2 an isometric view of an embodiment of a tool holder according to the invention;

FIG. 3 a plan view onto the contact surface of a tool holder according to the invention for illustration of a first bore pattern of the fastening screws;

FIG. 4 a plan view of the contact surface of a tool holder according to the invention for illustration of a second bore pattern of the fastening screws;

FIG. 5 a greatly enlarged, partially cut-away illustration of the mounting situation of a sliding block according to the invention in a groove 23 of the tool holder wherein the sliding block can be spread apart by a fastening screw;

FIG. 6 various views of the first embodiment of the sliding block according to the invention;

FIG. 7 a further embodiment of a sliding block according to the invention;

FIG. 8 an enlarged and partially cut-away illustration of the mounting situation of a further embodiment of a sliding block according to the invention in a tool holder;

FIG. 9 the corresponding sliding block in various views;

FIG. 10 a further mounting situation of a third embodiment of a sliding block according to the invention in a tool holder; and FIG. 11 a further embodiment of a sliding block according to the invention.

DESCRIPTION OF THE EMBODIMENTS

In FIG. 1a, a first embodiment of a tool carrier 1 according to the invention as well as an associated tool holder 3 according to the invention in an angled configuration are illustrated in isometric view. Aside from the tool holders 3 according to the invention, conventional tool holders according to DIN ISO 10889-1 and ff (not illustrated) can be inserted also into the tool carrier 1. The tool carrier 1 is embodied as a so-called star turret and has on its outer circumference a plurality of planar clamping surfaces 5. Approximately at the center of the clamping surfaces 5 there is a receiving bore 7 that serves for receiving a cylinder shaft 9 of the tool holder 3. There are also other turret arrangements, so-called disc-type turrets, where the tools are located on the end face. The invention is also usable in connection with such disc turrets.

The tool holder 3 in the illustrated embodiment is equipped with a spiral drill bit 11 and is inserted with the cylinder shaft 9 into the receiving bore 7 of the tool carrier 1. By means of the cylinder shaft 9 also the drive action of the spiral drill bit 11 is realized in the way known in the art. Based on this constellation, it is particularly apparent how important the precise and reproducible positioning of the tool holder 3 in the tool carrier 1 is in order to achieve a uniformly high manufacturing quality. Also, it is apparent that the advancing force is introduced parallel and displaced to the clamping surface 5 into the tool holder 3 and from the latter must be transmitted by the interface according to the invention onto the tool carrier 1.

In order to fasten the tool holder 3 on the tool carrier 1, screw heads 27 are visible on the left end face of the tool carrier 1 in FIG. 1a; they actuate a clamping device which is acting on the cylinder shaft 9 of the tool holder 3. These clamping devices are actuated by means of a hexagon wrench which is insertable into the screw heads 27. For clamping the tool holder 3 in the tool carrier 1, a toothing 15 (see FIG. 1a) of the kind defined in DIN ISO 10899-1 is formed on the cylinder shaft 9.

In the clamping surface 5 adjacent to the receiving bore 7 there is also a connector 13 for a cooling lubricant that serves to transfer the cooling lubricant into the tool holder 3 and to the tool that is clam ped in the tool holder 3.

In the turret illustrated in FIG. 1a, inner threads 25 and grooves 123 according to the invention are formed also, in addition to the planar clamping surface 5, the receiving bore 7, and the cylinder shaft 9 that are known from DIN ISO 10889-1.

The grooves 123 are arranged in the illustrated embodiment at a right angle relative to each other (cross groove). Their point of intersection coincides with the center point of the receiving bore 7. The sliding blocks according to the invention can also be employed when only one groove of the cross groove is used or the tool carrier (embodied as a turret) 1 has only one groove 123 in each one of the clamping surfaces 5. In these situations, the cylinder shaft 9 of the tool holder 3 in conjunction with the receiving bore 7 of the tool carrier 1 takes over positioning of the tool holder 3, and the sliding block or sliding blocks according to the invention determine the angular position of the tool holder 3.

In this context, it is possible to use the groove 123 that is extending in the circumferential direction of the turret or the groove 123 that is extending at a right angle thereto.

An advantage relative to the so-called W toothing of the company INDEX is the angular adjustability by means of the sliding block, the significantly simpler manufacture because the groove 123 extending in the circumferential direction of the turret can be produced by turning and must not be ground.

When positioning is realized by means of the cross groove and the cylinder shaft 9, it must be constructively determined whether positioning is realized by the clamped cylinder shaft 9 or the two sliding blocks.

Alternatively, only one groove 123 can be used when a cross groove is existing and clamping is done by means of the toothing according to DIN ISO 10889-1. In tool holders that are clamped by means of the fastening threads 25 and not by the toothing 15 of the cylinder shaft 9, the cross groove can be used for alignment and positioning without over-determination by the cylinder shaft 9.

The grooves 123 interact with sliding blocks of the tool holder 3 that are designed according to the invention and not visible in FIG. 1a in the manner according to the invention and effect an exact, adjustable and very well reproducible positioning of the tool holder 3.

The fastening threads 25 can serve for additional fixation of the tool holder 3 on the tool carrier 1. However, they can be used also as the sole fastening means of the tool holder 3 on the tool carrier 1.

An important aspect for describing the quality of the interface between tool carrier 1 and tool holder 3 is the repeat accuracy for multiple insertions of a tool holder 3 into the tool carrier 1. The VDI interface according to DIN ISO 10889-1 achieves a repeat accuracy of approximately 0.05 mm which is not sufficient for many workpieces, primarily high-quality workpieces, and requires a time-consuming and thus expensive compensation in the control unit of the associated machine tool.

The interface according to the invention enables a repeat accuracy of approximately 0.005 millimeters (5 micrometers) and is moreover adjustable so that manufacturing tolerances of approximately $1/100$ mm that occur even in case of high-precision manufacture can be compensated by preadjustment of the sliding blocks.

In FIG. 1b a second embodiment of a BMT turret 1 is illustrated that is developed further in accordance with the present invention and in which the tool holder 3 is fastened to the turret 1 by means of fastening screws 21 that are screwed into the fastening threads 25. Positioning is realized here also by means of the at least one groove 123 according to the invention and sliding blocks, not illustrated, according to the invention. In this context, in each of the clamping surfaces 5 a groove 123 or two grooves 123 formed as a cross groove can be provided.

In FIG. 2, the cylinder shaft 9 of the tool holder 3 can be seen better than in FIGS. 1a and 1b. Also, a contact surface 29 with which the tool holder 3 is pulled against the clamping surface 5 of the tool carrier 1 (see FIG. 1) is visible. In the illustrated embodiment, two grooves 23 arranged in a cross shape are formed in this contact surface 29. A total of four sliding blocks 31 in accordance with the invention are inserted and secured with fastenings screws 33 in these grooves 23.

In this context, in each of the contact surfaces 29 a groove 23 or two grooves 23 that are formed as a cross groove can be provided.

With the aid of the FIGS. 3 and 4, inter alia the different possibilities of use of the sliding blocks 31 according to the invention together with the groove or the grooves 23 will be explained in the following.

FIG. 3 shows a plan view of the contact surface 29 of the tool holder 3. In this illustration that is enlarged relative to FIG. 2, the grooves 23, the sliding blocks 31, and the fastening or clamping screws 33 are clearly shown.

Also clearly visible are at least one slot 37 in each of the sliding blocks 31. The slots 37 separate the second section of the sliding blocks 31 projecting past the contact surface 29 into a stiff part 36.1 and a springy part 36.2. For reasons of simplification, the reference numerals 36.1 and 36.2 are provided only for one of the sliding blocks 31.

In this illustration, it is apparent that the two sliding blocks 31 arranged in a groove 23 that is interrupted by the cylinder shaft 9 are positioned such that the fastening screws 33 are arranged on opposite sides of a symmetry axis or longitudinal axis of the grooves 23.

In the groove 23 that in FIG. 3 extends from the top to the bottom, the fastening screw 33 of the upper sliding block 31 is arranged to the left of the symmetry axis 35 of the groove 23 while the fastening screw 33 of the lower sliding block 31 in FIG. 3 is arranged to the right of the symmetry axis 35. The same holds true also for the groove 23 which extends horizontally in FIG. 3.

When the tool holder 3 is mounted on a tool carrier 1, the alignment and positioning of the tool holder 3 is realized by contact points 38 on the springy parts 36.2 of the sliding blocks 31. These contact points 38 are positioned on the sidewalls of the groove 23 in the tool carrier 1.

The rigid parts 36.1 of the sliding blocks 31 have no contact with the groove 23 in the tool carrier 1 for obtaining defined contact locations between the sliding blocks 31 and the grooves 23 of the tool carrier 1. Moreover, only one sidewall of the grooves 23 in the tool carrier 1 must therefore be manufactured with utmost precision.

In the illustrated embodiment, the alignment is realized by means of all four (4) sliding blocks 31. However, there is only one contact (see contact points 38) between the flexible parts 36.2 of the sliding blocks 31 and the sidewalls of the grooves 23 in the tool carrier 1. The clamping action is realized by means of the special arrangement of the sliding blocks 31 in accordance with the invention. As already mentioned above, the side that is opposite the contact points 38 is without contact with the sidewalls of the grooves 23 in the tool carrier 1. The springy parts 36.2 of the sliding blocks 31 have two tasks. Firstly, the adjustable position of the contact surface of the springy part 36.2 adjustable by the operator by appropriate tightening of the fastening screws 33 in order to adjust the tool holder in its position relative to the tool carrier 1 with regard to angle and linear displacement.

Secondly, to generate the required elasticity which is required for compensation of the unavoidable dimensional deviations from tool holder site to tool holder site. It is, of course, understood that the springy parts 36.2 represents very stiff springs, inter alia also due to the lateral support by the fastening screws 33.

Alternatively, but not illustrated in FIG. 3, at least three sliding blocks 31 are arranged in the cross groove such that the contact surface of the rigid part 36.1 of two sliding blocks 31 take over the angular alignment. The third and the optionally provided fourth sliding blocks 31 then take over the longitudinal stop function along the angular adjustment. The springy parts 36.2 on the sliding blocks 31 ensure in this situation that the tool holder 3 is aligned by means of the rigid parts 36.1 the sliding blocks 31 on the provided contact surfaces in the tool carrier 1.

In FIG. 4 a view similar to that shown in FIG. 3 is illustrated. However, in this embodiment the bore pattern of the arrangement of the fastening screws 33 is different. Here, the fastening screws of the sliding blocks 31 arranged relative to a groove are arranged on the same side of the longitudinal axis or symmetry axis of the groove.

In this bore pattern two situations are to be differentiated also.

Situation 1: When only one groove 23 is present, the sliding block 31 according to the invention is designed such that the rigid part 36.2 is contacted with the sidewall of the groove 23 (not illustrated in FIG. 4) of the tool carrier 1 and takes over the positional determination (see indicated contact points 38). The spring action of the springy part 36.2 of the sliding block 31 ensures that the tool holder 3 must align itself by means of the groove wall and the stiff part 36.1 of the sliding blocks 31.

When the sliding block 31 is constructed to be short, a second fixed point is needed, for example, the cylinder shaft 9 in case of the VDI holder, in order to achieve an unequivocal angular position. The cylinder shaft 9 would then secure the holder usually also in the other plane alignment.

In case of two sliding blocks 31 in one groove that are spaced apart from each other, the two sliding blocks 31 take over the angular alignment and the tool holder 3 must only be prevented by a cylinder shaft 9 or another support point, for example, in the form of a third or a fourth sliding block 31, from being moved in the plane along the angular alignment in the groove 23.

In the embodiment with two spaced-apart sliding blocks, only one "continuous" sidewall in the groove 23 serving as a contact surface is required in the tool carrier 1 for precise alignment. In this connection, it is of no consequence whether the contact surface or the groove 23 is interrupted by a receiving bore 7 for a cylinder shaft 9).

The sidewall of the groove 23 that is positioned opposite the contact points 38 must not be produced with high tolerance quality because the spring action of the elastic part 36.2 of the sliding block 31 compensates the manufacturing tolerances.

Both bore patterns can be realized with the same manufacturing expenditure and by using identical sliding blocks 31 so that, depending on the boundary conditions of the individual situation, one or the other bore pattern can be used.

The bore pattern illustrated in FIG. 4 enables in an especially simple way a parallel movement of the tool holder 3. Moreover, it is additionally possible to realize a rotational movement of the tool holder 3 by non-uniform tightening of the fastening screws 33. In order to obtain a pretension in the grooves, an additional spring action (O-ring, double-slotted sliding blocks etc.) is advantageous.

In an exemplary fashion, the lowermost sliding block in FIG. 4 therefore has a second slot 46.

In FIG. 5, the embodiment according to FIG. 3 or 4 is illustrated greatly enlarged in an isometric view and partially in cut-away illustration. In this illustration, it is apparent that the sliding block 31 is slotted wherein the slot 37 is positioned outside of a symmetry plane of the sliding block 31. By means of the slot 37 the upper section of the sliding block 31 that is projecting past the contact surface 29 is divided into a rigid part that is illustrated to the left of the fastening screw 33 and a springy part that is illustrated to the right of the fastening screw 33 in FIG. 5.

Through the slot 37 a through bore 39 passes and is of a truncated cone shape at the upper end in FIG. 5. The truncated cone shaped section is provided with reference numeral 41.

The groove 23 has two sidewalls 43 and a groove bottom 45. At the groove bottom 45 an inner thread (no reference character) is formed into which the fastening screw 33 is screwed. Based on FIG. 5, it is easily apparent that by tightening the fastening screw 33 more, the part of the sliding block 31 that is positioned to the right of the slot 37 that projects past the contact surface 29 is pushed laterally outwardly. In this way, the width B of the sliding block 31 is changed. Accordingly, by screwing in the fastening screw 33 to a greater or lesser extent, positioning of the tool holder 3 relative to the part of the sliding block 31 projecting past the contact surface 29 is possible.

The part of the sliding block 31 that is projecting past the contact surface 29, as explained in connection with FIGS. 1*a* and 1*b*, is inserted into appropriate grooves 23 in the clamping surface 5 of a tool carrier 1. Accordingly, by means of spreading apart to a greater or lesser extent of one or several sliding blocks 31, the position of the tool holder 3 relative to the tool carrier 1 can be adjusted.

In FIG. 6 the sliding block that is illustrated in the mounted state in FIG. 5 is illustrated in various views. From these views the constructive details of the sliding block 31 according to the invention can be taken.

Based on these different views of FIG. 6, the geometry of the sliding block 31 according to the invention as a prism-shaped body with rectangular cross-section is easily apparent. In this context, the sliding block 31 has a base surface 49 and two contact surfaces 51 that are extending parallel to each other. The slot 37 extends in this embodiment parallel to the contact surfaces 51. In this illustration it can be seen easily that the center point of the through bore 39 is not precisely at the center of the slot 37 but is arranged laterally displaced thereto. In this way, an improved spreading action of the fastening screw 33 (not illustrated in FIGS. 6 and 7) is provided.

The embodiment according to FIG. 7 corresponds substantially to the embodiment of FIG. 6. However, on a contact surface 51 in the area of the base surface 49 two projections 53 are formed which project somewhat past the contact surface 51. By means of the projections 53, a defined elastic, partially also plastic, deformation of the groove 23 in the tool holder 3 is caused. Moreover, the sliding block 31 is pressed with a relatively great and precisely predictable force against the contact surface 51 opposite the projections 53. Since this contact surface 51 is planar and the springy part of the sliding block 31 is also provided thereat, a further increase of reproducibility and precision with which the sliding block 31 positions the tool holder 3 in a tool carrier 1 is therefore achieved.

In FIG. 8 a further embodiment of a sliding block according to the invention is illustrated. In this embodiment, a shoulder 55 is formed on the sliding block 31. The shoulder 55 projects laterally past the contact surface 51 arranged to the right of the slot 37. The groove bottom 45 of the groove 23 in the tool holder 3 is of a stepped configuration. The step 57 interacts with a slant 59 in the area of the base surface 49 of the sliding block 31 in such a way that a certain deformation of the step 57 takes place when the fastening screw 33 is tightened. At the same time, a defined force is provided in this way which forces the sliding block 31 in FIG. 8 to the left against the sidewall 43 of the groove 23 located there. In this way, a defined position of the sliding block 31 relative to the groove 23 in the tool holder 3 is provided.

The shoulder 55 ends somewhat above the contact surface 29 of the tool holder. At the most narrow location between the slant 59 and the lower end of the slot 37, as a result of the elasticity of the material (high quality steel) of the sliding block 31, a springy hinge is formed for the angular lever that is comprised of the shoulder 55 and the springy contact surface 51.

When now the tool holder 3 with the sliding block 31 is inserted into a tool carrier 1, the width B of the sliding block 31 that is defined by the spacing of the contact surfaces 51 is dimensioned such that the sliding block 31 can be inserted with slight clearance into the groove 123 of the tool carrier 1. Shortly before the contact surface 29 of the tool holder 3 comes into contact with the clamping surface 5 of the tool carrier 1, the shoulder 55 contacts the clamping surface 5. When now by means of the fastening screws 21 the tool holder 3 is pulled against the clamping surface 5 of the tool carrier 1, the contact surface 51 to the right in FIG. 8 pivots to the right and is forced against the corresponding sidewall of the groove 123 in the tool carrier 1.

The slot 37 extends in this embodiment at a slant relative and parallel to the base surface 49 to the contact surfaces 51.

With this embodiment it is possible to insert the sliding blocks 31 with slight clearance and with minimal force into the grooves 23 of the tool carrier 1 and to generate, only by tightening or clamping the tool holder 3 by means of the fastening screws 21, a transverse press fit between the sliding block 31 and the grooves 23 in the tool carrier 1. As soon as the fastening screws 21 are released again, the tension of this transverse press fit is released and the tool holder 3 can be removed again with minimal force.

FIG. 9 shows the sliding block 31 according to the embodiment illustrated in FIG. 8 in various views.

In FIG. 9 it is clearly shown that an engagement surface 61 on the shoulder 55 is slightly inclined in the relaxed state so that when the tool holder 3 with its contact surface 29 is resting on the clamping surface 5 of the tool carrier 1 the force engagement surface 61 is also resting flat on the clamping surface 5 of the tool carrier 1.

In FIG. 10 a further embodiment of a sliding block 31 according to the invention is illustrated. In this embodiment the through bore 39 is designed symmetrically to the contact surfaces 51 and there are two slots 37. One slot begins or ends at the base surface 49 while the other slot is arranged on the surface opposite the base surface 49 and on the other side of the fastening screw 33. In this way, two elastic areas of the sliding block 31 are formed. The left elastic part of the sliding block 31 ensures a springy, i.e., clearance-free, and defined receiving or positioning of the sliding block in the groove 23 of tool holder 3 while the springy part of the sliding block 31 shown to the right and at the top of FIG. 10 effects a corresponding springy but still clearance-free positioning in the groove 123 of the tool carrier 1.

This embodiment is not adjustable but allows for, as a result of the flexibility, a comparatively inexpensive and large-tolerance manufacture and has an excellent repeat accuracy. Both slots can also be arranged together on one side of the sliding block.

In FIG. 11 a further embodiment of a sliding block according to the invention is illustrated. This embodiment combines features of the embodiment according to FIGS. 8 and 9 as well as 10. The attachment and positioning of the sliding block 31 in the groove 23 of the tool holder 3 is realized according to the embodiment of FIGS. 8 and 9 while the springy receiving action of the sliding block 31 in the groove of the tool carrier 1 is realized in the way disclosed in the embodiment according to FIG. 10.

What is claimed is:

1. A sliding block comprising:
    a base member having at least one contact surface, a base surface, and a top surface opposite the base surface;
    wherein the base member comprises a through bore penetrating the base member in a direction from the top surface to the bottom surface;
    wherein the base member further comprises a slot arranged off-center in the base member;
    the slot comprising an opening at the top surface of the base member and further comprising sidewalls extending from the opening in a direction toward the base surface of the base member;
    the slot further comprising a bottom connecting ends of the sidewalls opposite the opening, wherein the bottom extends parallel to the base surface;
    the sidewalls of the slot extending in the same direction as the at least one contact surface.

2. The sliding block according to claim 1, wherein the slot extends parallel or at a slant relative to the at least one contact surface and the base surface.

3. The sliding block according to claim 1, wherein a longitudinal axis of the through bore is positioned between a plane that is defined by the slot and the at least one contact surface.

4. The sliding block according to claim 1, wherein the through bore has an end that is positioned opposite the base surface and is embodied as a truncated cone.

5. The sliding block according to claim 1, wherein the at least one contact surface has a shoulder and the shoulder projects laterally past the at least one contact surface.

6. The sliding block according to claim 1, further comprising at least one projection formed on the at least one contact surface in the area of the base surface.

7. The sliding block according to claim 6, wherein the at least one projection projects by less than 0.3 mm past the at least one contact surface.

8. A tool holder comprising a contact surface having means for fastening a sliding block according to claim 1.

9. The tool holder according to claim 8, wherein the means for fastening comprise at least one groove.

10. The tool holder according to claim 8, wherein the means for fastening comprise an inner thread.

11. The tool holder according to claim 8, wherein the means for fastening comprise two grooves provided in the contact surface and the two grooves are orthogonal relative to each other to form a cross groove.

12. The tool holder according to claim 9, wherein a groove bottom of the at least one groove has at least one threaded bore.

13. The tool holder according to claim 12, wherein the at least one threaded bore serves for fastening and/or spreading apart a sliding block.

14. The tool holder according to claim 12, wherein the at least one threaded bore is positioned off-center in the at least one groove.

15. A tool holder comprising:
    a contact surface having means for fastening a sliding block, the sliding block comprising a base member having at least one contact surface, a base surface, a through bore penetrating the base surface, and a slot arranged off-center in the base member, the slot having a bottom that extends parallel to the base surface, and the slot extending in the same direction as the at least one contact surface;
    wherein the means for fastening comprise at least one groove;
    wherein a groove bottom of the at least one groove has two threaded bores, wherein the two threaded bores are positioned off-center in the at least one groove, wherein the at least one groove has a symmetry axis, and wherein the two threaded bores are positioned on the same side of the symmetry axis or on opposite sides of the symmetry axis.

16. The tool holder according to claim 12, wherein the at least one threaded bore is not perpendicular to the contact surface of the tool holder.

17. A tool holder comprising:
- a contact surface having means for fastening a sliding block, the sliding block comprising a base member having at least one contact surface, a base surface, a through bore penetrating the base surface, and a slot arranged off-center in the base member, the slot having a bottom that extends parallel to the base surface, and the slot extending in the same direction as the at least one contact surface;
- wherein the means for fastening comprise at least one groove;
- wherein the at least one groove has a sidewall and a part of the sidewall is configured as a contact surface for the sliding block or several of the sliding blocks, wherein the at least one groove is of a stepped configuration so that a pocket is formed above said part of the sidewall.

18. The tool holder according to claim 17, wherein the sliding block has at least one contact surface provided with a shoulder and the shoulder projects laterally past the at least one contact surface of the sliding block, wherein the at least one groove receives the sliding block such that the pocket receives the shoulder.

19. The tool holder according to claim 18, wherein the shoulder projects with an engagement surface past the contact surface of the tool holder when the sliding block is inserted into the at least one groove.

20. A tool carrier comprising a clamping surface, wherein the clamping surface has at least one groove, the tool carrier adapted for receiving a tool holder according to claim 8.

21. The tool carrier according to claim 20, wherein the clamping surface has two of said grooves.

22. The tool carrier according to claim 20, wherein the clamping surface has a receiving bore and a longitudinal axis of the receiving bore extends orthogonally relative to the clamping surface.

23. The tool carrier according to claim 20, wherein the clamping surface has several fastening threads.

24. A tool carrier comprising a clamping surface, wherein the clamping surface has at least one groove, the tool carrier adapted for receiving a sliding block according to claim 1.

25. The tool carrier according to claim 24, wherein the clamping surface has two of said grooves.

26. The tool carrier according to claim 24, wherein the clamping surface has a receiving bore and a longitudinal axis of the receiving bore extends orthogonally relative to the clamping surface.

27. The tool carrier according to claim 24, wherein the clamping surface has several fastening threads.

* * * * *